US009438396B2

United States Patent
Kakishima et al.

(10) Patent No.: US 9,438,396 B2
(45) Date of Patent: Sep. 6, 2016

(54) RADIO COMMUNICATION SYSTEM, MOBILE TERMINAL APPARATUS, RADIO BASE STATION APPARATUS AND RADIO COMMUNICATION METHOD

(71) Applicant: NTT DOCOMO, INC., Tokyo (JP)

(72) Inventors: Yuichi Kakishima, Tokyo (JP); Yoshihisa Kishiyama, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 43 days.

(21) Appl. No.: 14/398,834

(22) PCT Filed: Apr. 24, 2013

(86) PCT No.: PCT/JP2013/061981
§ 371 (c)(1),
(2) Date: Nov. 4, 2014

(87) PCT Pub. No.: WO2013/168560
PCT Pub. Date: Nov. 14, 2013

(65) Prior Publication Data
US 2015/0131551 A1 May 14, 2015

(30) Foreign Application Priority Data

May 10, 2012 (JP) ................................. 2012-108742

(51) Int. Cl.
*H04L 5/00* (2006.01)
*H04J 13/22* (2011.01)
*H04W 72/04* (2009.01)
*H04J 13/00* (2011.01)
*H04L 27/26* (2006.01)

(52) U.S. Cl.
CPC ......... *H04L 5/0048* (2013.01); *H04J 13/0062* (2013.01); *H04J 13/22* (2013.01); *H04L 27/2613* (2013.01); *H04W 72/0466* (2013.01); *H04L 5/0023* (2013.01)

(58) Field of Classification Search
None
See application file for complete search history.

(56) References Cited

U.S. PATENT DOCUMENTS

| | | | | |
|---|---|---|---|---|
| 2010/0157918 A1* | 6/2010 | Kim | ...................... | H04L 5/0023 370/329 |
| 2010/0210274 A1* | 8/2010 | Iwai | ........................ | H04J 13/22 455/450 |
| 2010/0272022 A1* | 10/2010 | Iwai | ..................... | H04B 1/7143 370/328 |
| 2010/0284265 A1* | 11/2010 | Ogawa | .................. | H04J 11/005 370/208 |
| 2010/0285755 A1* | 11/2010 | Iwai | ..................... | H04B 1/7143 455/68 |
| 2012/0275409 A1* | 11/2012 | Han | ...................... | H04L 1/0007 370/329 |

OTHER PUBLICATIONS

International Search Report issued in PCT/JP2013/061981 mailed on Jul. 2, 2013 (2 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

(Continued)

*Primary Examiner* — Gary Mui
(74) *Attorney, Agent, or Firm* — Osha Liang LLP

(57) ABSTRACT

The present invention is designed to allow more DM-RS sequences to be allocated, and more DM-RS resources to be secured. The radio communication method of the present invention has a characteristic of generating DM-RS sequences using ZC sequences that are allocated in a new number of randomized sequences between the number of randomized sequences corresponding to a ZC sequence having a length of the largest prime number, not exceeding the ZC sequence length required in the uplink DM-RS, and the number of randomized sequences defined in Rel. 10 LTE.

12 Claims, 9 Drawing Sheets

(56) References Cited

OTHER PUBLICATIONS

3GPP TS 36.211 V10.4.0; "3rd Generation Partnership Project; Technical Specification Group Radio Access Network; Evolved Universal Terrestrial Radio Access (E-UTRA) Physical Channels and Modulation (Release 10)"; Dec. 2011 (4 pages).

New Postcom; "Uplink reference signals for uplink CoMP"; 3GPP TSG RAN WG1 Meeting #67, R1-113693; San Francisco, USA; Nov. 14-18, 2011 (6 pages).

Panasonic et al.; "RACH sequence allocation and indication to the cell"; 3GPP TSG RAN WG1 Meeting #50, R1-073836; Athens, Greece; Aug. 20-24, 2007 (10 pages).

Texas Instruments; "Uplink reference Signal Sequence Assignments in E-UTRA"; 3GPP TSG RAN WG1 #51, R1-074675; Jeju, Korea; Nov. 5-9, 2007 (3 pages).

ZTE; "Remaining Issues on UL DM RS Sequence hopping"; 3GPP TSG RAN1 #52, R1-080779; Sorrento, Italy; Feb. 11-15, 2008 (3 pages).

Office Action issued in corresponding Japanese Application No. 2012-108742, mailed Dec. 8, 2015 (9 pages).

* cited by examiner

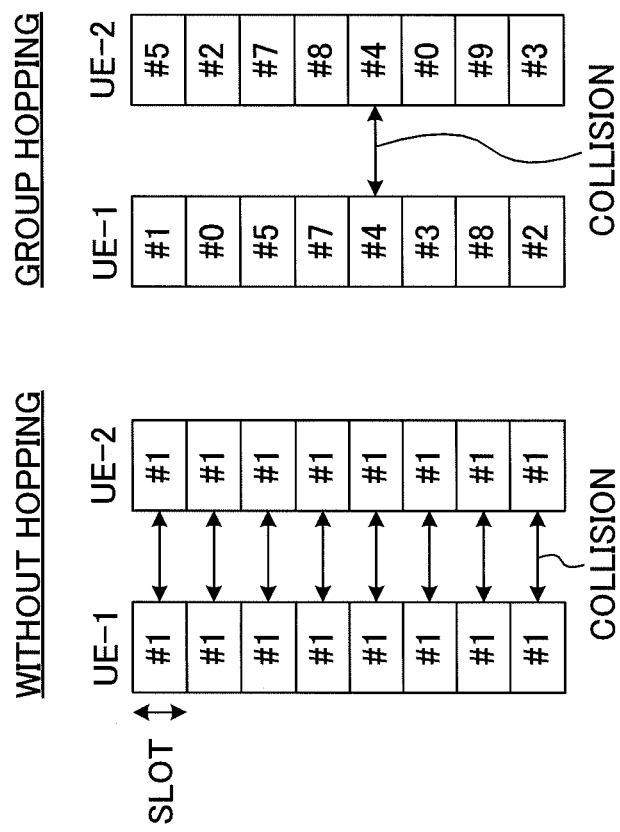
FIG.2C
FIG.2B
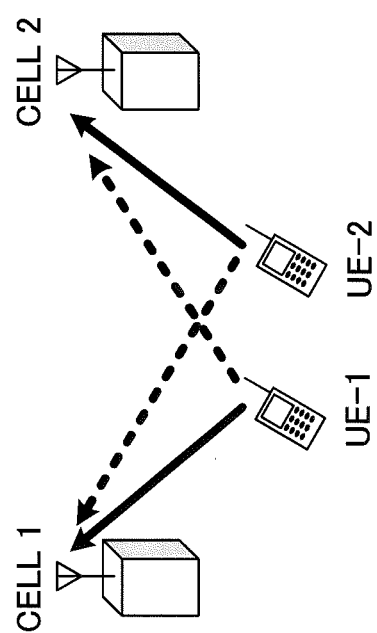
FIG.2A

RADIO COMMUNICATION SYSTEM, MOBILE TERMINAL APPARATUS, RADIO BASE STATION APPARATUS AND RADIO COMMUNICATION METHOD

TECHNICAL FIELD

The present invention relates to a radio communication system, a mobile terminal apparatus, a radio base station apparatus and a radio communication method.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study for the purpose of achieving further broadbandization and higher speed (for example, "LTE-advanced" (LTE-A)). For example, in LTE-A, there is a plan to expand the maximum system band for LTE specifications, which is 20 MHz, to approximately 100 MHz.

In LTE-A, uplink reference signals are enhanced, and the DM-RS (Demodulation-Reference Signal), which is used in channel estimation upon demodulation of the PUSCH (Physical Uplink Shard Channel) signal, the PUCCH (Physical Uplink Control Channel) signal and so on, is defined. This DM-RS is time-multiplexed and transmitted with the RBs (Resource Blocks) to transmit the PUSCH signal/PUCCH signal. For example, in the PUSCH, the DM-RS is multiplexed over the third SC-FDMA (Single Carrier Frequency Division Multiple Access) symbol in each slot.

Furthermore, in the LTE-A system, intra-cell orthogonalization is made possible by orthogonal multiple access on both the uplink and the downlink. That is to say, on the downlink, orthogonality is established between mobile terminal apparatuses, UEs (User Equipments), in the frequency domain. On the other hand, between cells, like in W-CDMA, interference randomization by one-cell frequency reuse is fundamental. So, in the 3GPP (3rd Generation Partnership Project), the coordinated multiple-point transmission/reception (CoMP) technique is under study as a technique for realizing inter-cell orthogonalization. In this CoMP transmission/reception, a plurality of cells coordinate and perform signal processing for transmission and reception for one user terminal UE or for a plurality of mobile terminal apparatus UEs. For example, for the downlink, simultaneous transmission of a plurality of cells adopting precoding, and coordinated scheduling/beam forming, are under study. By adopting these CoMP transmission/reception techniques, improvement of throughput performance is expected, especially with respect to user terminal UEs located on cell edges.

CITATION LIST

Non-Patent Literature

Non-Patent Literature 1: 3GPP, TR 25.912 (V7.1.0), "Feasibility Study for Evolved UTRA and UTRAN," September 2006

SUMMARY OF INVENTION

Technical Problem

When CoMP transmission is carried out on the uplink, improvement of performance may be anticipated by simultaneously orthogonalizing and transmitting DM-RSs to a plurality of radio base station apparatuses. Considering a transmission mode like this, there are not sufficient DM-RS resources. DM-RSs use Zadoff-Chu (ZC)-based sequences. Consequently, there is a demand to make it possible to allocate more DM-RS sequences (ZC sequences) and secure more DM-RS resources.

The present invention has been made in view of the above, and it is therefore an object of the present invention to provide a radio communication system, a mobile terminal apparatus, a radio base station apparatus and a radio communication method that make it possible to allocate more DM-RS sequences (ZC sequences) and secure more DM-RS resources.

Solution to Problem

The radio communication system of the present invention provides a radio base station apparatus and a mobile terminal apparatus that is configured to be able to communicate with the radio base station apparatus, and, in this radio communication system, the radio base station apparatus has an allocation section configured to allocate Zadoff-Chu sequences in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE, and the mobile terminal apparatus has a generating section configured to generate demodulation reference signal sequences using the Zadoff-Chu sequences allocated in the new number of randomized sequences.

The radio base station apparatus of the present invention is a radio base station apparatus in a radio communication system providing the radio base station apparatus and a mobile terminal apparatus that is configured to be able to communicate with the radio base station apparatus, and this radio base station apparatus has an allocation section configured to allocate Zadoff-Chu sequences in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE.

The mobile terminal apparatus of the present invention is a mobile terminal apparatus in a radio communication system providing a radio base station apparatus and the mobile terminal apparatus configured to be able to communicate with the radio base station apparatus, and this mobile terminal apparatus has a generating section configured to generate demodulation reference signal sequences using Zadoff-Chu sequences allocated in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE.

The radio communication method of the present invention is a radio communication method in a radio communication system providing a radio base station apparatus and a mobile terminal apparatus that is configured to be able to communicate with the radio base station apparatus, and this radio communication method includes the steps of: in the radio base station apparatus, allocating Zadoff-Chu sequences in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE; and in the mobile terminal apparatus, generating demodulation reference signal sequences using the Zadoff-Chu sequences allocated in the new number of randomized sequences.

Advantageous Effects of Invention

According to the present invention, it is possible to allocate more DM-RS sequences and secure more DM-RS resources.

BRIEF DESCRIPTION OF DRAWINGS

FIG. 2 provides diagrams to explain the collision of DM-RSs between neighboring cells;

DESCRIPTION OF EMBODIMENTS

Now, an embodiment of the present invention will be described below in detail with reference to the accompanying drawings. For the DM-RSs to use in channel estimation upon demodulation of the PUSCH signal and the PUCCH signal, the Zadoff-Chu (ZC)-based sequence shown in following equation 1 is used. In LTE and LTE-A, varying ZC sequences are applied between neighboring cells, so that DM-RSs are randomized between cells.

[Formula 1]

$$x_q(m) = \begin{cases} e^{-j\pi \cdot qm(m+1)/N} & N = \text{odd number} \\ e^{-j\pi \cdot qm^2/N} & N = \text{even number} \end{cases} \quad \text{(Equation 1)}$$

where:
N is the sequence length;
q is the sequence number; and
$0 \leq m \leq N-1$ holds.

In above equation 1, if the sequence length N and the sequence number q are prime to each other, the cross correlation value becomes $1/\sqrt{N}$. This means that, when the sequence length N is a prime number, (N−1) sequences can be generated. Also, ZC sequences have a zero autocorrelation characteristic (the correlation between a given ZC sequence and a sequence given by applying a cyclic shift to that ZC sequence is zero).

In LTE of Rel. 8 to Rel. 10, processing is carried out on a per RB (12 subcarriers) basis, so that a ZC sequence length of 12n is required. Since 12n is not a prime number, the number of randomized sequences that can be generated is small, and therefore a sufficient number of randomized sequences cannot be acquired. Consequently, DM-RS sequences are generated by applying cyclic extension, whereby the data of a front part is copied to a rear part, to a ZC sequence having a length to match the largest prime number, not exceeding the required ZC sequence length. By so doing, it is possible to increase the number of sequences. Note that the ZC sequence is generated by the algorithm shown in following equation 2 (when the ZC sequence length is 3 RBs or greater). Also, the number of randomized sequences is the number of randomized sequences to correspond to a ZC sequence having a length of the largest prime number, not exceeding the ZC sequence length required in the reference signal.

[Formula 2]

$$\bar{r}_{u,v}(n) = x_q(n \bmod N_{ZC}^{RS}), \quad \text{(Equation 2)}$$
$$0 \leq n < M_{sc}^{RS}$$
$$x_q(m) = e^{-j\frac{\pi qm(m+1)}{N_{ZC}^{RS}}},$$
$$0 \leq m \leq N_{ZC}^{RS} - 1$$
$$q = \lfloor \bar{q} + 1/2 \rfloor + v \cdot (-1)^{\lfloor 2\bar{q} \rfloor}$$
$$\bar{q} = N_{ZC}^{RS} \cdot (u+1)/31$$

In equation 2, u is the group number, v is the base sequence number, and q is the sequence number.

Figure 1:
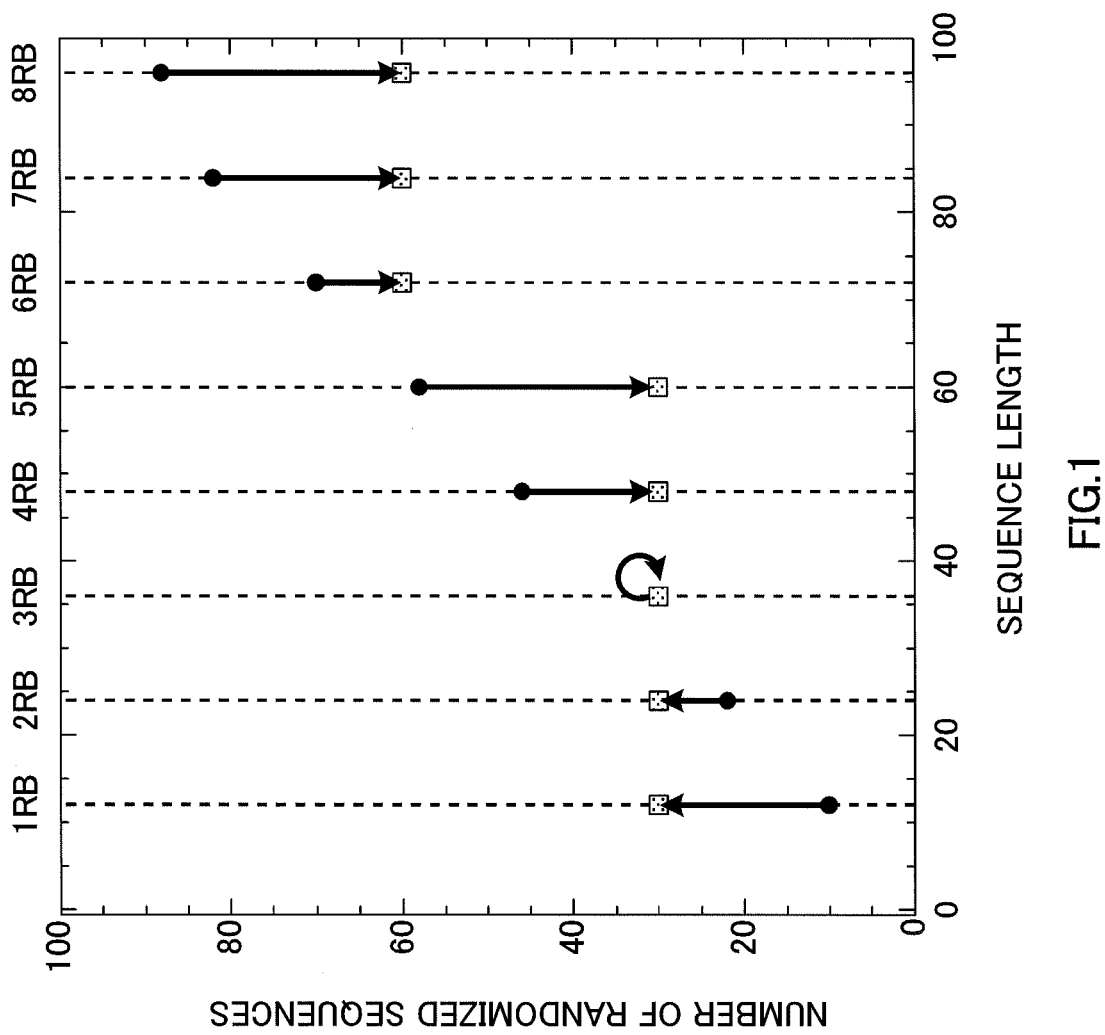
FIG. 1 is a diagram to show the relationship between the number of sequences and the number of randomized sequences.

Meanwhile, in LTE of Rel. 8 to Rel. 10, in order to make the system simple, the number of sequences to use as DM-RSs is set to 30 or 60, depending on the number of RBs. As shown in FIG. 1, in the bandwidth of 1 RB to 5 RBs, the number of randomized sequences of DM-RS is set to 30, and, in the bandwidth of 6 RBs to 8 RBs, the number of randomized sequences of DM-RS is set to 60 (the square symbols in FIG. 1).

In this case, in the bandwidth of 1 RB to 2 RBs, the number of randomized sequences does not reach 30 even if the above-described cyclic extension is applied, so that 30 randomized sequences, calculated by means of a calculator, are used. In the bandwidth of 3 RBs to 5 RBs, among the DM-RS sequences generated by applying cyclic extension to the ZC sequence generated using above equation 2, 30 DM-RS sequences are used. In the bandwidth of 6 RBs or more, among the DM-RS sequences generated by applying cyclic extension to the ZC sequence generated using above equation 2, 60 DM-RS sequences are used. The DM-RSs are generated by following equation 3, using the DM-RS sequences.

[Formula 3]

$$r_{u,v}^{(\alpha)}(n) = e^{j\alpha n} \bar{r}_{u,v}(n), 0 \le n < M_{sc}^{RS} \quad \text{(Equation 3)}$$

In equation 3, u is the group number, v is the base sequence number, q is the sequence number, and α is the cyclic shift number.

As shown in equations 2 and 3, group numbers (u=0 to 29) (indices) are assigned to the 30 DM-RS sequences, and group numbers (u=0 to 29) and base sequence numbers (v=0, 1) (indices) are assigned to the 60 DM-RS sequences, so that identification can be made. Note that, when group hopping, which will be described later, is executed in Rel. 10 LTE, the base sequence number is "0" and fixed. These group numbers and base sequence numbers can be each calculated from the cell IDs. Also, the sequence number q can be calculated from the group number u and the base sequence number v. Also, information about the cyclic shift in equation 3 is reported from a radio base station apparatus to a mobile terminal apparatus through L1/L2 signaling.

Although, in LTE of Rel. 8 to Rel. 10, 60 DM-RS sequences can be prepared and these DM-RS sequences can be identified individually with group numbers and base sequence numbers and used, when group hopping, which will be described later, is executed, only 30 DM-RS sequences are used, using the base sequence number 0 alone.

When assigning DM-RS sequences like such, if, for example, as shown in FIG. 2A, the same DM-RS sequence (group number and base sequence number) is assigned between neighboring cells (cell-1 and cell-2), as shown in FIG. 2B, the DM-RS collides between mobile terminal apparatuses UE-1 and UE-2, and the DM-RS causes significant interference against other cells, the accuracy of channel estimation decreases, and the performance of demodulation deteriorates.

So, in LTE of Rel. 8 to Rel. 10, as shown in FIG. 2C, the group numbers to use upon generating DM-RS sequences are hopped on a per slot basis, to reduce the possibility of DM-RS collisions between neighboring cells (group hopping). The patterns in this hopping use Gold sequences, and the number of these sequences is 17.

Figure 3:
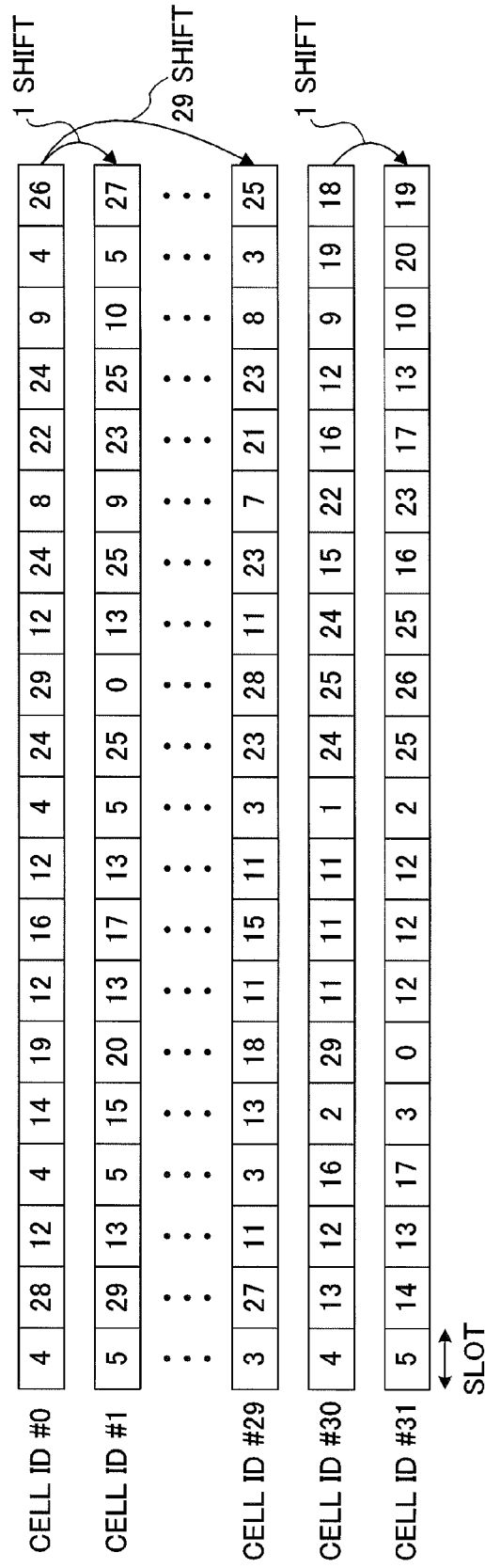
FIG. 3 is a diagram to explain group hopping.

To be more specific, as shown in FIG. 3, the patterns for cell IDs #0 to #29 are generated from one random sequence (Gold sequence), the patterns for cell IDs #30 to #59 are generated from one random sequence, the patterns for cell IDs #60 to #89 are generated from one random sequence, . . . , and the patterns for cell IDs #480 to #509 are generated from one random sequence. The group number in each slot in each pattern is cyclically shifted. For example, cell ID #0 and cell ID #1 in FIG. 3 are shifted through 1, and cell ID #0 and cell ID #29 are shifted through 29. Also, cell ID #30 and cell ID #31 are shifted through 1.

In this way, by using group hopping, it is possible to reduce the possibility of DM-RS collisions between neighboring cells. In this case, the number of random sequences (Gold sequences) is 17, and there are 30 group numbers from 0 to 29, so that it is possible to secure a total of 510 DM-RS sequences, and, in Rel. 10 LTE, among these, DM-RS sequences for 504 cells are used. Note that the application of group hopping, the hopping method and so on are reported from a radio base station apparatus to a mobile terminal apparatus through higher layer signaling (for example, broadcast information).

With the above-described method, it is possible to realize randomization of DM-RSs between cells. Meanwhile, the orthogonalization of DM-RSs in cells can be realized by using cyclic shift (CS) and orthogonal cover code (OCC). In Rel. 10 LTE, in addition to the orthogonalization by means of cyclic shift supported in Rel. 8 LTE, code-division-multiplexing by means of orthogonal cover code is also introduced, in order to support maximum 4-layer transmission on the uplink. To be more specific, two symbols in a subframe are made orthogonal to each other by applying the OCCs of [1, 1] and [1, −1] to the two symbols. Rel. 10 LTE is designed such that eight combinations of CS and OCC can be designated. These combinations are reported from a radio base station apparatus to a mobile terminal apparatus through L1/L2 signaling.

Figure 4:
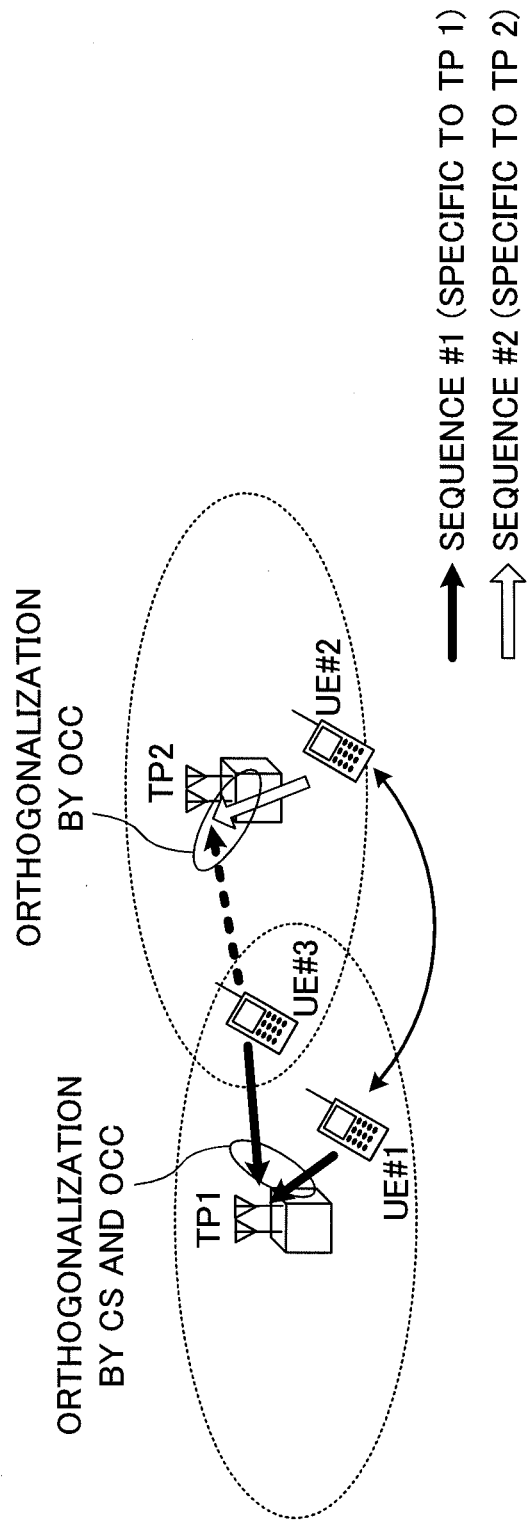
FIG. 4 is a diagram to explain a radio communication system taking uplink CoMP into account.

In 3GPP, when CoMP transmission is carried out on the uplink, improvement of performance may be anticipated by simultaneous orthogonalization and transmission to a plurality of radio base station apparatuses (transmission points). For example, as shown in FIG. 4, in the cell of a transmission point TP 1, which communicates with mobile terminal apparatus UE #1, DM-RSs are orthogonalized by means of CS and OCC, and, in the cell of a transmission point TP 2, which communicates with mobile terminal apparatus UE #2, DM-RSs are orthogonalized by means of OCC. At this time, the DM-RSs are generated by above equation 3, using the group numbers and base sequence numbers calculated from the cell IDs, and the sequence numbers q calculated from the group numbers u and the base sequence numbers v. That is, in Rel. 10 LTE, DM-RS sequences are generated on a per cell basis using cell IDs. In FIG. 4, DM-RS sequence #1 is used in the cell of transmission point TP 1, and DM-RS sequence #2 is used in the cell of transmission point TP 2.

However, considering the case where mobile terminal apparatus UE #3 performs uplink CoMP transmission with respect to transmission points TP 1 and TP 2, UE #3 may be able to achieve improved performance by making the DM-RSs orthogonal to both UE #1 and UE #2. In this way, when DM-RSs are made orthogonal to transmission points TP 1 and TP 2 at the same time, it then becomes necessary not to apply group hopping, whereby cell ID-based group numbers are hopped. While a total of 510 DM-RS sequences are secured using group hopping heretofore, if group hopping is not applied, a problem arises that sufficient resources of DM-RS sequences cannot be achieved. That is, when uplink CoMP transmission is applied to transmission points TP 1 and TP 2, a problem arises that the DM-RS sequence resources run short, and the flexibility of DM-RS sequence resource allocation decreases.

So, the present inventors have focused on effective use of unused DM-RS sequence resources shown in FIG. 1, and arrived at the present invention by finding out that, even when uplink signals for transmission points TP 1 and TP 2 are made orthogonal, it is still possible to secure the flexibility of DM-RS sequence resource allocation.

That is, a gist of the present invention is that, in a radio base station apparatus, ZC sequences are allocated in a new number of randomized sequences between the number of randomized sequences to correspond to a ZC sequence having a length of the largest prime number, not exceeding the ZC sequence length required in the uplink DM-RS reference signal, and the number of randomized sequences defined in Rel. 10 LTE, and, in a mobile terminal apparatus, DM-RS sequences are generated using the ZC sequences allocated in the new number of randomized sequences, so that it is possible to allocate more DM-RS sequences and improve the flexibility of allocation of more DM-RS resources.

With the present invention, upon DM-RS resource allocation, ZC sequences that are allocated in LTE of Rel. 10 or earlier versions are allocated. That is, allocation is carried out using a number of ZC sequence between the number of randomized sequences of square symbols and the number of randomized sequences of circle symbols, in the transmission bandwidth of 4 RBs ore more shown in FIG. 1. That is, a radio base station apparatus allocates ZC sequences in a new number of randomized sequences between the number of randomized sequences to correspond to a ZC sequence having a length of the largest prime number, not exceeding the ZC sequence length required in the uplink DM-RS reference signal, and the number of randomized sequences defined in Rel. 10 LTE. Also, a mobile terminal apparatus generates DM-RS sequences using the ZC sequences allocated in the new number of randomized sequences. By this means, it is possible to improve the flexibility of DM-RS resource allocation.

When allocating ZC sequences that are not allocated in LTE of Rel. 10 or earlier versions, the following methods may be possible.

(First Method)

With a first method, when the transmission bandwidth is 4 RBs or more, unlike the square symbols in FIG. 1, the number of randomized sequences is not limited (in Rel. 10 LTE, the number of randomized sequences is limited to 30 up to 5 RBs and limited to 60 from 6 RBs onward), and, in each transmission bandwidth, allocation is carried out using ZC sequences of the maximum number of randomized sequences. That is, in FIG. 1, the number of ZC sequences to use in allocation as the number of randomized sequences is 46 in the 4-RB transmission bandwidth, 58 in the 5-RB transmission bandwidth, 70 in the 6-RB transmission bandwidth, 82 in the 7-RB transmission bandwidth, and 88 in the 8-RB transmission bandwidth.

With the first method, when the transmission bandwidth is 4 RBs or more, the limits of the number of randomized sequences, like the square symbols in FIG. 1, may be alleviated. For example, although, in Rel. 10 LTE, the number of randomized sequences is limited to 30 up to 5 RBs and limited to 60 from 6 RBs onward, in the transmission bandwidth of 4 RBs and 5 RBs, allocation is carried out using ZC sequences that are more than 30 yet fewer than the largest number of randomized sequences, and, in the transmission bandwidth of 6 RBs or more, allocation is carried out using ZC sequences that are more than 60 yet fewer than the largest number of randomized sequences.

As for the signaling in the first method, the sequence number q in the ZC sequence generation algorithm of above equation 2 is directly signaled (reported). In Rel. 10 LTE, the group number u and the base sequence number v in the ZC sequence generation algorithm (DM-RS generation algorithm) of above equation 2 are signaled. Also, the sequence number q is determined in a mobile terminal apparatus from the group number u and the base sequence number v that are reported. The group number u and the base sequence number v are both values that can be determined from the cell ID.

Consequently, in Rel. 10 LTE, the signaling of ZC sequences is signaling to be carried out on a per cell basis.

However, as described above, in order to improve the flexibility of DM-RS sequence allocation taking uplink CoMP into account, signaling needs to be carried out on a per UE basis, not on a per cell basis. The sequence number q in the ZC sequence generation algorithm of equation 2 is determined from the group number u and the base sequence number v, so it necessarily follows that the sequence number q is also a parameter that is associated with the cell ID.

So, with the first method, the sequence number q is directly signaled from a radio base station apparatus to a mobile terminal apparatus, thereby using the sequence number q as a UE-specific parameter. By this means, it is possible to carry out signaling on a per UE basis, and improve the flexibility of DM-RS resource allocation. For the signaling of the sequence number q, it may be possible to use a broadcast channel and higher layer signaling such as RRC signaling, or it may be possible to use lower layer signaling as well. Note that, with lower layer signaling, reporting may be carried out using DCI (Downlink Control Information) of the PDCCH (Physical Downlink Control Channel), or reporting may be carried out using DCI of the enhanced PDCCH (e-PDCCH), or reporting may be made using both of these.

Also, with the first method, the sequence number q may be derived from indices that are signaled from a radio base station apparatus to a mobile terminal apparatus through higher layer signaling—for example, virtual cell IDs ($V_{cell}$IDs), UEIDs and so on.

In this case, for example, the mobile terminal apparatus derives the sequence number q by performing a remainder calculation between an index X that is signaled, and the largest number of randomized sequences Y per RB (X % Y).

Also, with the first method, it is also possible to derive the sequence number q from parameters (Z) that are not signaled from a radio base station apparatus to a mobile terminal apparatus—for example, the group hopping pattern number $f_{gh}(n_s)$, the sequence shift pattern numbers $f_{gh}^{PUCCH}$ and $f_{gh}^{PUSCH}$, the number of offsets $\Delta_{SS}$ of the PUCCH and the PUSCH, the initial random sequence number $c_{init}$ and so on. Although these parameters Z can be determined by performing a remainder calculation by the numerical value 30, this numerical value 30 may be replaced with the largest number of randomized sequences Y. For example, the mobile terminal apparatus performs a remainder calculation between the parameters Z and the largest number of randomized sequences Y per RB (Z % Y) and derives the sequence number q.

(Second Method)

In Rel. 10 LTE, the number of randomized sequences is set to two levels—namely, 30 and 60. With a second method, the new number of randomized sequences is defined not only by the numbers of randomized sequences defined in Rel. 10 LTE, but is also defined by another number of randomized sequences apart from the numbers of randomized sequences defined in Rel. 10 LTE. That is, with the second method, the levels defined in Rel. 10 LTE are made three or more. For example, the number of randomized sequences is made 15 when the transmission bandwidth is 1 RB and 2 RBs, the number of randomized sequences is made 30 when the transmission bandwidth is 3 RBs and 4 RBs, the number of randomized sequences is made 45 when the transmission bandwidth is 5 RBs and 6 RBs, and the number of randomized sequences is made 60 when the transmission bandwidth is 7 RBs and 8 RBs. By means of this setting, it is possible to effectively use and allocate ZC sequences up to the largest number of randomized sequences in each transmission bandwidth. Note that the number of randomized sequences to correspond to each level can be set as appropriate. Also, the number of levels can be set as appropriate as well.

(Third Method)

As obvious from FIG. 1, the number of randomized sequences increases as the transmission bandwidth widens, so that, with a third method, ZC sequences are not allocated to a narrow transmission bandwidth—for example, up to 4 RBs. This method is particularly effective when group hopping is not applied.

(Fourth Method)

With a fourth method, the new number of randomized sequences is determined by combining the group number u and the base sequence number v. For example, with the fourth method, group hopping and sequence hopping are combined. With the fourth method, for example, when the transmission bandwidth is 6 RBs or more, group hopping and sequence hopping are combined. That is, 30 patterns of group numbers u and 2 patterns of base sequence numbers v are combined to secure maximum 60 randomized sequences. As described above, given that, considering uplink CoMP, a greater number of sequences than heretofore is required, and that there is a demand to secure a greater number of sequences even at the risk of sacrificing some signaling overhead, with the fourth method, the base sequence number v, which is used in one value up to Rel. 10 LTE, is used in a plurality of values. With the fourth method, signaling overhead increases a little, so that the following signaling and implicit reporting become important.

As for the signaling in the fourth method, the sequence number q in the ZC sequence generation algorithm of above equation 2 is directly signaled. This is particularly effective when group hopping is not applied. In this way, the sequence number q is directly signaled from a radio base station apparatus to a mobile terminal apparatus, thereby using the sequence number q as a UE-specific parameter. By this means, it is possible to carry out signaling on a per UE basis, and improve the flexibility of DM-RS resource allocation. For the signaling of the sequence number q, it may be possible to use a broadcast channel and higher layer signaling such as RRC signaling, or it may be possible to use lower layer signaling as well. Note that, with lower layer signaling, reporting may be carried out using the PDCCH, or reporting may be carried out using DCI of the enhanced PDCCH, or reporting may be made using both of these.

Also, with the fourth method, a method to derive 60 sequence numbers q from indices that are signaled from a radio base station apparatus to a mobile terminal apparatus through higher layer signaling—for example, virtual cell IDs ($V_{cell}$IDs), cell IDs and so on—may be used. In this case, for example, the mobile terminal apparatus performs a remainder calculation of the indices ($V_{cell}$IDs, cell IDs and so on) W that are signaled, and derives the sequence number q (W %60).

Also, with the fourth method, the base sequence number v (0 or 1) may be reported semi-statically through higher layer signaling. By this means, it is possible to reduce overhead. This method is particularly effective when group hopping is not applied.

Besides the above first method to the fourth method, sequences other than ZC sequences may be used to improve the flexibility of DM-RS sequence resource allocation. That is, without using ZC sequences as DM-RS sequences, spreading gain is achieved by applying random codes like the scrambling codes used in W-CDMA (Wideband-Code Division Multiple Access), as DM-RSs. Here, as the random codes, for example, Gold sequences (M sequence and PN sequence) can be used.

Figure 5:
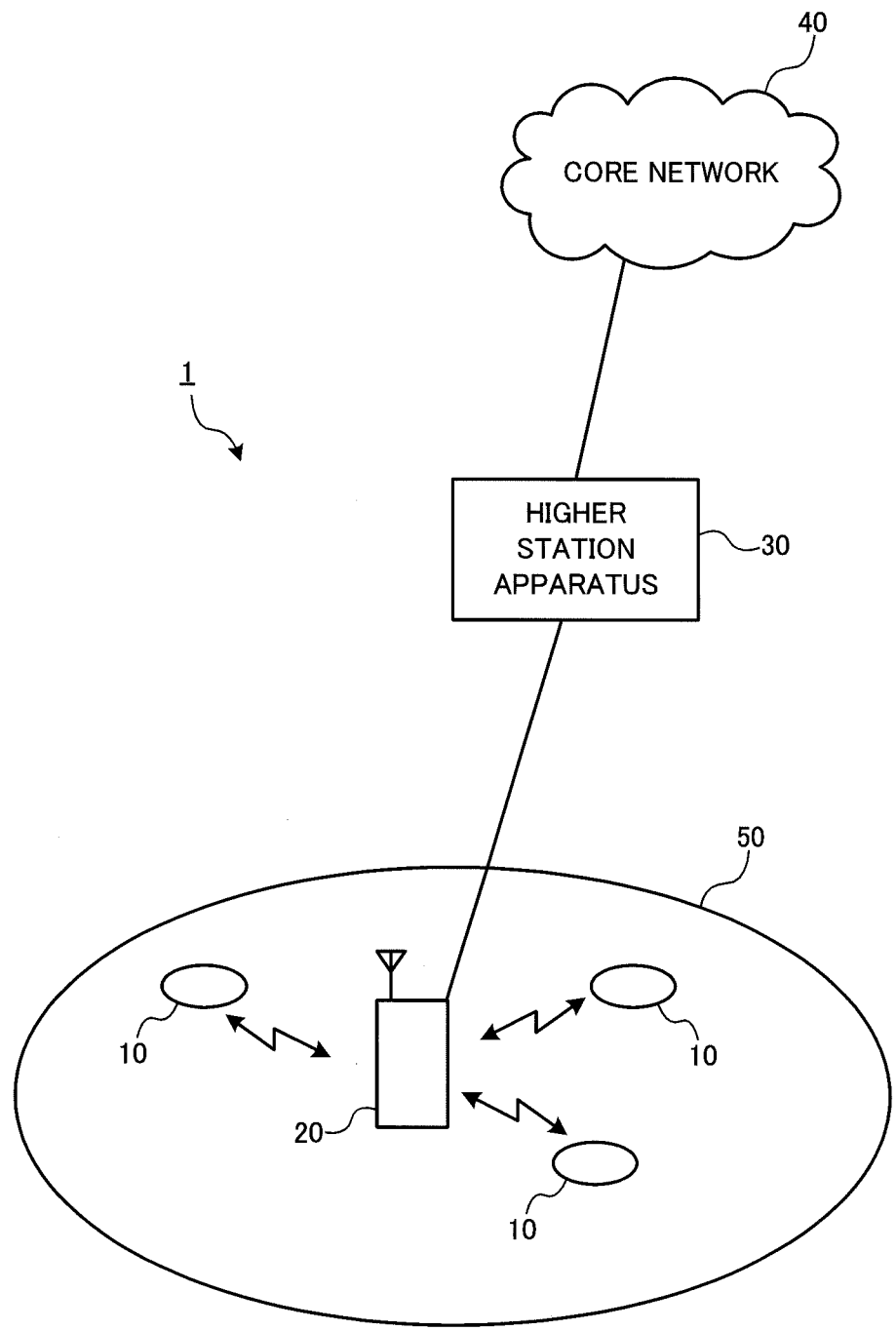
FIG. 5 is a diagram to show a radio communication system according to an embodiment of the present invention.

Now, a configuration of a radio communication system according to an embodiment of the present invention will be described below. FIG. 5 is a schematic diagram to show a radio communication system according to an embodiment of the present invention.

The radio communication system 1 is, for example, a system where LTE-A is applied. The radio communication system 1 has a radio base station apparatus 20, and a plurality of mobile terminal apparatuses 10 that communicate with this radio base station apparatus 20. The radio base station apparatus 20 is connected with a higher station apparatus 30, which is, for example, an access gateway apparatus 30, and the access gateway apparatus 30 is connected with a core network 40. The mobile terminal apparatus 10 communicates with the radio base station apparatus 20 in a cell 50 by evolved UTRA and UTRAN. Note that the access gateway apparatus 30 may be referred to as MME/SGW (Mobility Management Entity/Serving Gateway).

The mobile terminal apparatuses 10 have the same configuration, functions, and state. Also, although the mobile terminal apparatuses 10 will be described to perform radio communication with the radio base station apparatus 20 for ease of explanation, more generally, user equipment (UE) to include both mobile terminal apparatuses and fixed terminal apparatuses may be used as well.

In the radio communication system 1, as radio access schemes, radio access that is based on OFDMA (Orthogonal Frequency Division Multiple Access) is applied to the downlink, and radio access that is based on SC-FDMA (Single Carrier Frequency Division Multiple Access) is applied to the uplink. Here, OFDMA (Orthogonal Frequency Division Multiple Access) is a multi-carrier transmission scheme to divide a frequency band into a plurality of narrow frequency bands (subcarriers) and place and transmit data on each subcarrier. SC-FDMA (Single Carrier Frequency Division Multiple Access) is a single carrier transmission scheme to reduce interference between terminals by dividing, per terminal, the system band into bands formed with one or continuous resource blocks, and allowing a plurality of terminals to use mutually different bands.

Here, communication channels in evolved UTRA and UTRAN will be described. On the downlink, the PDSCH (Physical Downlink Shared Channel), which is used by each mobile terminal apparatus 10 on a shared basis, and the PDCCH (also referred to as the downlink L1/L2 control channel), which is a downlink control channel, are used. By means of this PDSCH, user data—that is, normal data signals—is transmitted. Also, by means of the PDSCH, precoding information for uplink MIMO transmission, the IDs of users that communicate using the PDSCH and information about the users' data transport format (that is, downlink scheduling information), and the IDs of users that communicate using the PUSCH (Physical Uplink Shared Channel) and information about the users' data transport format (that is, uplink scheduling grant) and so on are fed back.

Also, on the downlink, broadcast channels such as the P-BCH (Physical Broadcast Channel) and the D-BCH (Dynamic Broadcast Channel) are transmitted. The information that is transmitted by means of the P-BCH is MIBs (Master Information Blocks), and the information that is transmitted by means of the D-BCH is SIBs (System Information Blocks). The D-BCH is mapped to the PDSCH, and transmitted from the radio base station apparatus 20 to the mobile terminal apparatuses 10.

As for the uplink, the PUSCH, which is used by each mobile terminal apparatus 10 on a shared basis, and the PUCCH (Physical Uplink Control Channel), which is an uplink control channel, are used. By means of the PUSCH, user data—that is, normal data signals—is transmitted. Also, by means of the PUCCH, precoding information for downlink MIMO transmission, delivery acknowledgment information for downlink shared channels, downlink radio quality information (CQI: Channel Quality Indicator) and so on are transmitted.

Also, in the uplink, the PRACH (Physical Random Access Channel) for initial connection and so on are defined. The mobile terminal apparatuses 10 are designed to transmit random access preambles to the radio base station apparatus 20 in the PRACH.

Figure 6:
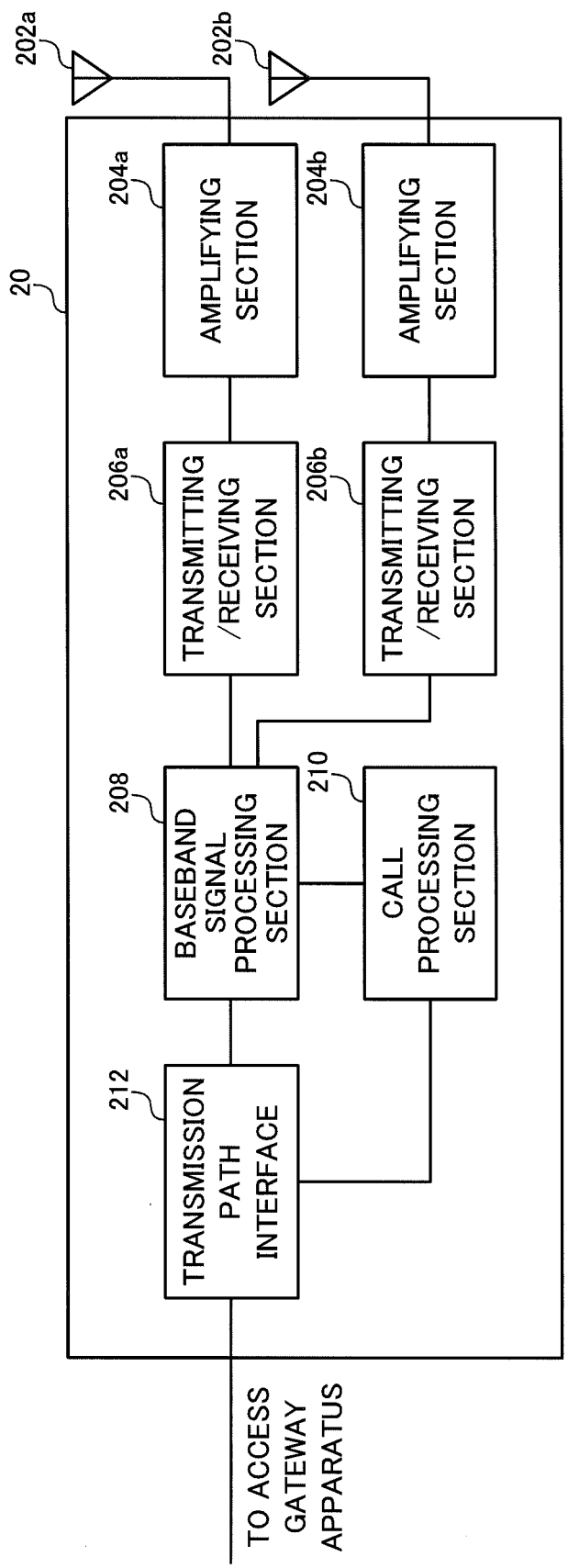
FIG. 6 is a block diagram to show a configuration of a radio base station apparatus according to the above embodiment.

Next, a configuration of the radio base station apparatus 20 according to the present embodiment will be explained with reference to FIG. 6. As shown in FIG. 6, the radio base station apparatus 20 according to the present embodiment has two transmitting/receiving antennas 202a and 202b for MIMO transmission, amplifying sections 204a and 204b, transmitting/receiving sections 206a and 206b, a baseband signal processing section 208, a call processing section 210, and a transmission path interface 212.

User data that is transmitted from the radio base station apparatus 20 to a mobile terminal apparatus 10 on the downlink is input from the higher station apparatus 30 that is placed above the radio base station apparatus 20—for example, the access gateway apparatus 30—into the baseband signal processing section 208, via the transmission path interface 212.

The baseband signal processing section 208 performs a PDCP layer process, division and coupling of user data, RLC (Radio Link Control) layer transmission processes such as an RLC retransmission control transmission process, MAC (Medium Access Control) retransmission control, including, for example, an HARQ (Hybrid Automatic Repeat reQuest) transmission process, scheduling, transport format selection, channel coding, an inverse fast Fourier transform (IFFT) process, and a precoding process, and transfers the result to the transmitting/receiving sections 206a and 206b. Furthermore, the PDCCH signal is also subjected to transmission processes such as channel coding and an inverse fast Fourier transform, and then transferred to the transmitting/receiving sections 206a and 206b.

Also, the baseband signal processing section 208 feeds back control information for communication in the cell to the mobile terminal apparatus 10, through the above-described broadcast channels. The control information for communication in the cell includes, for example, the uplink or downlink system bandwidth, resource block information allocated to the mobile terminal apparatus 10, root sequence identification information (root sequence index) for generating random access preamble signals in the PRACH and so on.

Baseband signals that are precoded and output from the baseband signal processing section 208 on a per antenna basis are subjected to a frequency conversion process to be convert into a radio frequency band in the transmitting/receiving sections 206a and 206b, and, after that, amplified in the amplifying sections 204a and 204b and transmitted from the transmitting/receiving antennas 202a and 202b.

On the other hand, as for the data to be transmitted from the mobile terminal apparatus 10 to the radio base station apparatus 20 on the uplink, radio frequency signals that are received in the transmitting/receiving antennas 202a and 202b are amplified in the amplifying sections 204a and 204b, converted into baseband signals through frequency conversion in the transmitting/receiving sections 206a and 206b, and input in the baseband signal processing section 208.

The baseband signal processing section 208 applies, to the user data included in the baseband signals received as input, an FFT process, an IDFT process, error correction decoding, a MAC retransmission control receiving process, and RLC layer and PDCP layer receiving processes, and transfers the result to the access gateway apparatus 30 via the transmission path interface 212.

The call processing section 210 performs call processing such as setting up and releasing communication channels, manages the state of the radio base station apparatus 20, and manages the radio resources.

Figure 7:
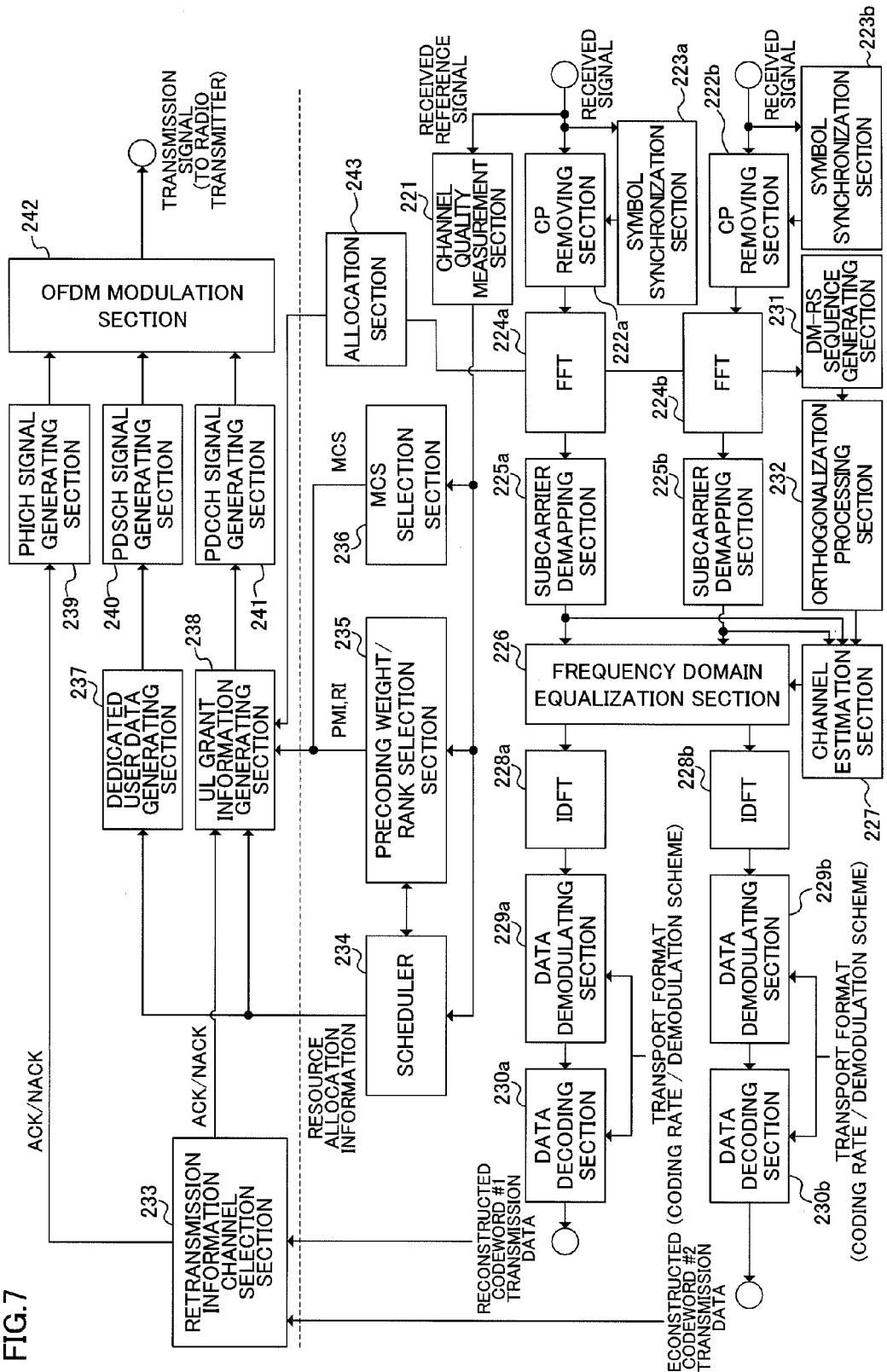
FIG. 7 is a functional block diagram of a baseband signal processing section in the radio base station apparatus shown in FIG. 6.

Now, a configuration of the baseband signal processing section 208 of the radio base station apparatus 20 according to the present embodiment will be described with reference to FIG. 7. FIG. 7 is a functional block diagram of the baseband signal processing section 208 in the radio base station apparatus 20 according to the present embodiment. Note that, in FIG. 7, for ease of explanation, configurations such as a scheduler 234 and others are also included.

Reference signals (quality measurement reference signal) included in received signals are input in a channel quality measurement section 221. The channel quality measurement section 221 measures uplink channel quality information (CQI) based on the received state of the reference signals received from the mobile terminal apparatus 10. Meanwhile, received signals that are input in the baseband signal processing section 208 have the cyclic prefixes added to the received signals removed in CP (Cyclic Prefix) removing sections 222a and 222b, and, after that, converted into frequency domain information through a Fourier transform in fast Fourier transform (FFT) sections 224a and 224b. Note that the symbol synchronization sections 223a and 223b estimate the synchronization timing from the reference signals included in the received signals, and report the estimation result to the CP removing sections 222a and 222b.

The received signals, converted into frequency domain information, are demapped in the frequency domain in the subcarrier demapping sections 225a and 225b. The subcarrier demapping sections 225a and 225b perform demapping in accordance with the mapping in the mobile terminal apparatus 10. The frequency domain equalization section 226 equalizes the received signals based on channel estimation values provided from a channel estimation section 227. The channel estimation section 227 estimates the channel state from the reference signals included in the received signals.

The DM-RS sequence generating section 231 generates uplink DM-RS sequences (DM-RSs). The DM-RS sequence generating section 231 generates the DM-RS sequences using ZC sequences that are allocated in an allocation section 243, which will be described later. Above equation 2 and equation 3 are used for the generation of the DM-RS sequences. The DM-RS sequence generating section 231 realize inter-cell randomization. The DM-RS sequence generating section 231 outputs the generated DM-RS sequences to an orthogonalization processing section 232.

The orthogonalization processing section 232 performs processes to undo the orthogonalization process applied to the DM-RS upon uplink transmission. That is, to the CS that is applied to the DM-RS, the orthogonalization processing section 232 applies a CS of the opposite direction, and, to the OCC applied to the DM-RS, the orthogonalization processing section 232 applies a despreading process. The orthogonalization processing section 232 outputs the DM-RS, converted back to the original, to the channel estimation section 227.

The inverse discrete Fourier transform (IDFT) sections 228*a* and 228*b* perform an inverse discrete Fourier transform on the received signal and converts the frequency domain signal back to a time domain signal. The data demodulating sections 229*a* and 229*b* and the data decoding sections 230*a* and 230*b* reconstruct the transmission data based on the transmission format (coding rate, modulation scheme and so on). By this means, transmission data of codeword #1 corresponding to the first transport block, and transmission data of codeword #2 corresponding to the second transport block are reconstructed.

The reconstructed transmission data of codewords #1 and #2 is output to a retransmission information channel selection section 233. The retransmission information channel selection section 233 determines whether or not it is necessary to retransmit the transmission data of codewords #1 and #2 (ACK/NACK). Then, depending on whether or not it is necessary to retransmit the transmission data of codewords #1 and #2, retransmission-related information such as NDI information and RV information is generated. Also, the retransmission information channel selection section 233 selects the channel (PHICH or PDCCH (UL grant)) to transmit the retransmission information.

The scheduler 234 determines uplink and downlink resource allocation information based on channel quality information (CQI) given from the channel quality measurement section 221, and PMI information and RI information given from a precoding weight/rank selection section 235, which will be described later.

The precoding weight/rank selection section 235 determines the precoding weight (PMI) for controlling the phase and/or amplitude of transmission signals on a per antenna basis in the mobile terminal apparatus 10 from the uplink received quality in the resource block allocated to the mobile terminal apparatus 10 based on channel quality information (CQI) given from the channel quality measurement section 221. Also, the precoding weight/rank selection section 235 determines the rank (RI), which represents the number of space multiplexing layers in the uplink, based on channel quality information (CQI) given from the channel quality measurement section 221.

The MCS selection section 236 selects the modulation scheme/channel coding rate (MCS) based on channel quality information (CQI) given from the channel quality measurement section 221.

The dedicated user data generating section 237 generates dedicated downlink transmission data (specific user data) for each mobile terminal apparatus 10, in accordance with resource allocation information given from the scheduler 234, from user data input from the higher station apparatus 30 such as the access gateway apparatus 30.

The UL grant information generating section 238 generates a DCI format, which includes the above-described UL grant, from ACK/NACK information and retransmission-related information (NDI information, RV information and so on) given from the retransmission information channel selection section 233, resource allocation information given from the scheduler 234, PMI and RI information given from the precoding weight/rank selection section 233, and MCS information given from the MCS selection section 236.

The PHICH signal generating section 239 generates the PHICH signal, which includes a hybrid ARQ acknowledgement for showing whether or not the transport block needs to be retransmitted to the mobile terminal apparatus 10, based on the ACK/NACK information and retransmission-related information (NDI information, RV information and so on) given from the retransmission information channel selection section 233.

The PDSCH signal generating section 240 generates the downlink transmission data to actually transmit by the PDSCH (Physical Downlink Shard Channel), based on the downlink transmission data (dedicated user data) generated in the dedicated user data generating section 237. The PDCCH signal generating section 241 generates the PDCCH signal to multiplex over the PDCCH, based on the DCI format generated in the UL grant information generating section 238 and including the UL grant.

The PHICH signal, the PDSCH signal and the PDCCH signal generated in these PHICH signal generating section 239, PDSCH signal generating section 240 and PDCCH signal generating section 241, are input in an OFDM modulation section 242. The OFDM modulation section 242 applies an OFDM modulation process to two sequences of signals including these PHICH signal, PDSCH signal and PDCCH signal, and transmits the results to the transmitting/receiving sections 206*a* and 206*b*.

Upon DM-RS resource allocation, the allocation section 243 allocates ZC sequences that are not allocated in LTE of Rel. 10 or earlier versions. That is, the allocation section 243 allocates ZC sequences in a new number of randomized sequences between the number of randomized sequences to correspond to a ZC sequence having a length of the largest prime number, not exceeding the ZC sequence length required in the uplink DM-RS reference signal, and the number of randomized sequences defined in Rel. 10 LTE. To be more specific, the allocation section 243 allocates the ZC sequences in the above first method to the fourth method. The allocation section 243 outputs information about the ZC sequences allocated in this way (for example, the parameters in the first method to the fourth method), to the DM-RS sequence generating section 231.

Part of the information of the ZC sequences is signaled to the mobile terminal apparatus 10. For example, with the first method and the fourth method, the sequence number q is signaled. Also, with the second method, the number of randomized sequences, the number of levels and so on are signaled. Also, with the third method, the base sequence number is signaled. Note that sequence number q may be reported to a mobile terminal apparatus 10 through higher layer signaling or may be reported through the PDCCH using DCI. This signaling is signaling that is based on the mobile terminal apparatus UE.

Figure 8:
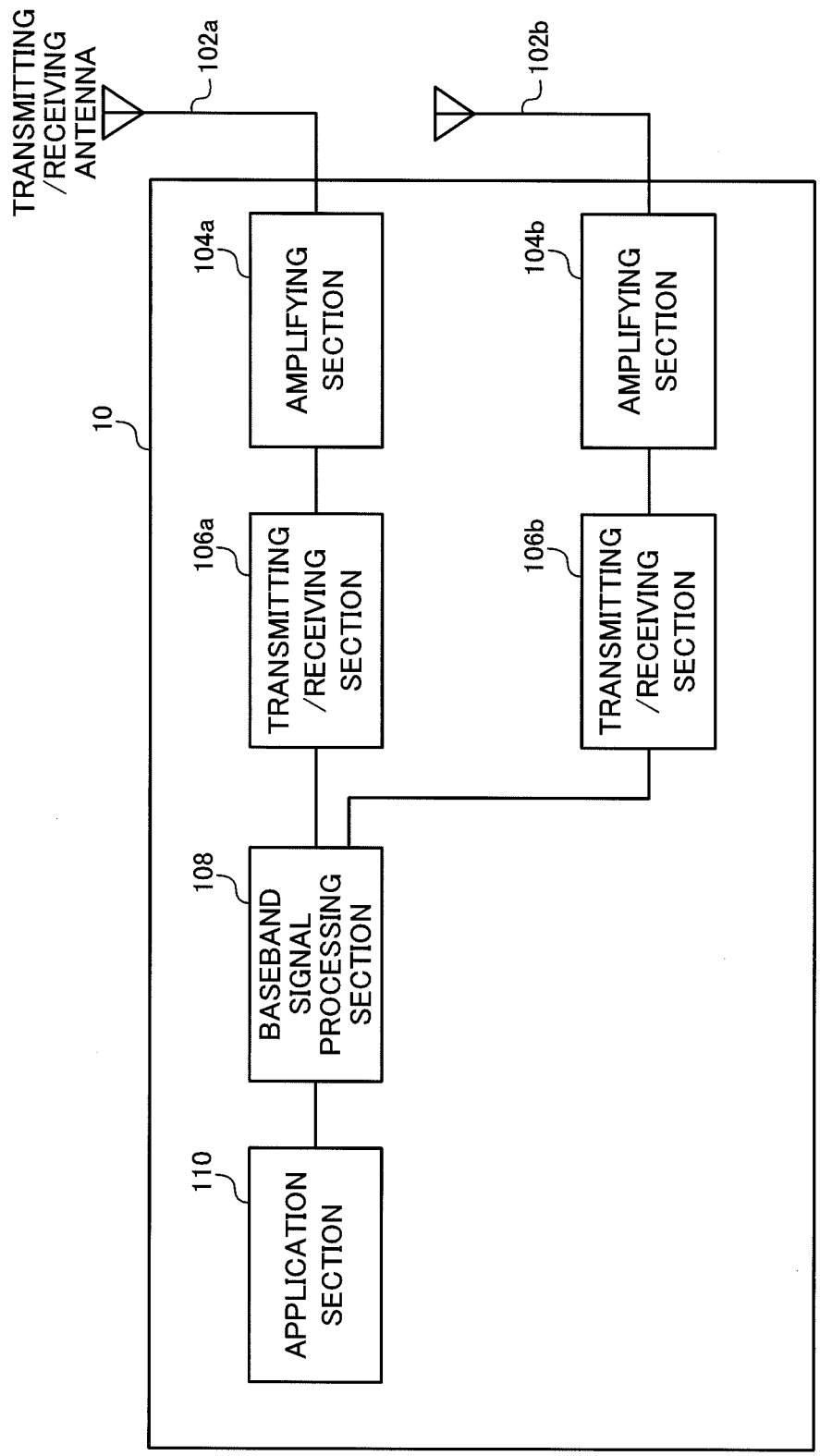
FIG. 8 is a block diagram to show a configuration of a mobile terminal apparatus according to the above embodiment.

Next, a configuration of a mobile terminal apparatus 10 according to the present embodiment will be described with reference to FIG. 8. As shown in FIG. 8, the mobile terminal apparatus 10 according to the present embodiment has two transmitting/receiving antennas 102*a* and 102*b* for MIMO transmission, amplifying sections 104*a* and 104*b*, transmitting/receiving sections 106*a* and 106*b*, a baseband signal processing section 108 and an application section 110.

As for downlink data, radio frequency signals that are received in the two transmitting/receiving antennas 102*a* and 102*b* are amplified in the amplifying sections 104*a* and 104*b*, and converted into baseband signals through frequency conversion in the transmitting/receiving sections 106*a* and 106*b*. The baseband signals are subjected to receiving processes such as an FFT process, error correction decoding and retransmission control, in the baseband signal processing section 108. In this downlink data, downlink user data is transferred to the application section 110. The application section 110 performs processes related to higher layers above the physical layer and the MAC layer. Also, in the downlink data, broadcast information is also transferred to the application section 110.

On the other hand, uplink user data is input from the application section 110 to the baseband signal processing section 108. The baseband signal processing section 108 performs a retransmission control (H-ARQ: Hybrid ARQ) transmission process, channel coding, precoding, DFT process, IFFT process and so on, and transfers the result to the transmitting/receiving sections 106*a* and 106*b*. The baseband signals output from the baseband signal processing section 108 are subjected to a frequency conversion process and converted into a radio frequency band in the transmitting/receiving sections 106*a* and 106*b*, and, after that, amplified in the amplifying sections 104*a* and 104*b* and transmitted from the transmitting/receiving antennas 102*a* and 102*b*.

Figure 9:
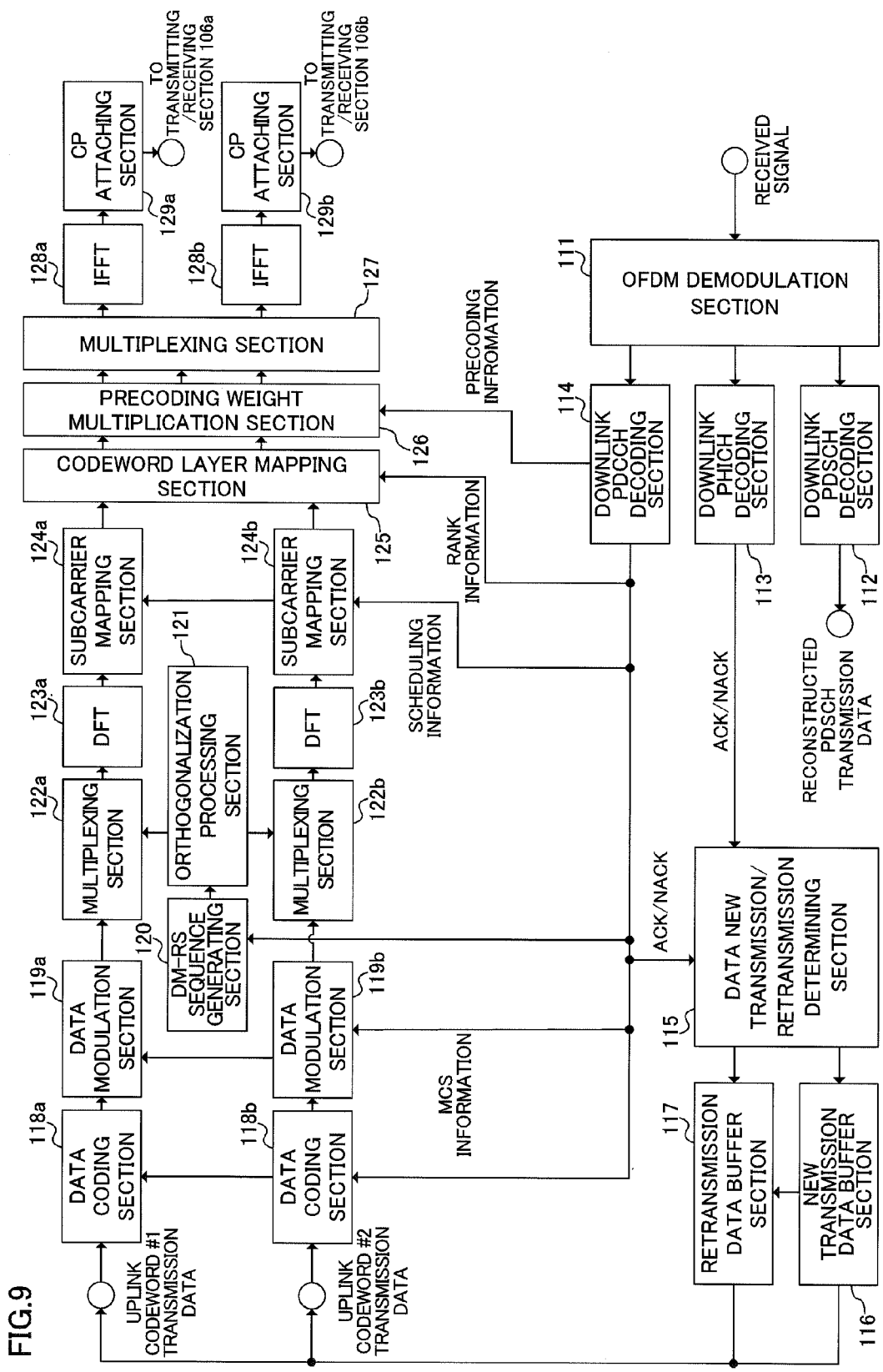
FIG. 9 is a functional block diagram of a baseband signal processing section in the mobile terminal apparatus shown in FIG. 8.

Now, a configuration of the baseband signal processing section 108 in the mobile terminal apparatus 10 according to the present embodiment will be described with reference to FIG. 9. FIG. 9 is a functional block diagram of the baseband signal processing section 108 of the mobile terminal apparatus 10 according to the present embodiment.

Received signals output from the transmitting/receiving sections 106*a* and 106*b* are demodulated in the OFDM demodulation section 111. In the downlink received signals demodulated in the OFDM demodulation section 111, the PDSCH signal is input in the downlink PDSCH decoding section 112, the PHICH signal is input in the downlink PHICH decoding section 113, and the PDCCH signal is input in the downlink PDCCH decoding section 114. The downlink PDSCH decoding section 112 decodes the PDSCH signal, and reconstructs the PDSCH transmission data. The downlink PHICH decoding section 113 decodes the downlink PHICH signal. The downlink PDCCH decoding section 114 decodes the PDCCH signal. The PDCCH signal includes the DCI format, which includes the UL grant, used in the communication control method according to the present invention.

The downlink PDCCH decoding section 114 acquires the control information designated by the UL grant. When a hybrid ARQ acknowledgement (ACK/NACK) is included in the PHICH signal decoded in the downlink PHICH decoding section 113, the data new transmission/retransmission determining section 115 determines whether this is new data transmission or retransmission, based on that hybrid ARQ acknowledgement (ACK/NACK). Also, when a hybrid ARQ acknowledgement (ACK/NACK) is included in the UL grant of the PDCCH signal, whether this is new data transmission or retransmission is determined based on that hybrid ARQ acknowledgement (ACK/NACK). The determined results are reported to a new transmission data buffer section 116 and a retransmission data buffer section 117.

The new transmission data buffer section 116 buffers the uplink transmission data input from the application section 110. The retransmission data buffer section 117 buffers the transmission data output from the new transmission data buffer section 116. When a determined result to the effect of new data transmission is reported from the data new transmission/retransmission determining section 115, uplink transmission data is generated from the transmission data in the new transmission data buffer section 116. On the other hand, when a determined result to the effect of data retransmission is reported from the data new transmission/retransmission determining section 115, uplink transmission data is generated from the transmission data in the retransmission data buffer section 117.

The uplink transmission data that is generated is input in a serial-to-parallel conversion section, which is not illustrated. In this serial-to-parallel conversion section, uplink transmission data is subjected to serial-to-parallel conversion, into the number of codewords, depending on the uplink rank. Note that the codewords represent the coding unit in channel coding, and the number thereof (the number of codewords) is determined uniquely based on the rank and/or the number of transmitting antennas. A case is shown here where the number of codewords is determined to be two. Note that the number of codewords and the number of layers (rank) do not always become equal. Uplink codeword #1 transmission data and uplink codeword #2 transmission data are input in the data coding sections 118*a* and 118*b*.

The data coding section 118*a* encodes the uplink codeword #1 transmission data. The uplink codeword #1 transmission data encoded in the data coding section 118*a* is modulated in the data modulation section 119*a*, and output to the multiplexing section 122*a*. Also, the data coding section 118*b* encodes the uplink codeword #2 transmission data. The uplink codeword #2 transmission data encoded in the data coding section 118*b* is modulated in the data modulation section 119*b* and output to the multiplexing section 122*b*.

The DM-RS sequence generating section 120 generates uplink DM-RS sequences (DM-RSs). The DM-RS sequence generating section 120 generates the DM-RS sequences using ZC sequence information reported from the radio base station apparatus. Above equation 2 and equation 3 are used for the generation of the DM-RS sequences. The DM-RS sequence generating section 120 realizes inter-cell randomization.

At this time, in the DM-RS sequence generating section 120, when the sequence number q is reported in the first method and the fourth method, DM-RS sequences are generated by above equation 2 and equation 3, using the sequence number q. Also, the sequence generating section 120 may derive the sequence number q by performing a remainder calculation between indices X signaled from the radio base station apparatus and the largest number of randomized sequences Y per RB (X % Y), derive the sequence number q by performing a remainder calculation between parameters (Z) that are not signaled from the radio base station apparatus and the largest number of randomized sequences Y per RB (Z % Y), or derive the sequence number q by performing a remainder calculation with respect to indices W ($V_{cell}$ID, cell ID and so on) signaled from the radio base station apparatus (W %60). Also, with the second method, DM-RS sequences are generated using the number of randomized sequences, the number of levels and so on signaled from the radio base station apparatus. Also, with the third method, DM-RS sequences are generated using the base sequence number signaled from the radio base station apparatus. The DM-RS sequence generating section 120 outputs the generated DM-RS sequences to the orthogonalization processing section 121.

The orthogonalization processing section 121 applies an orthogonalization process to the DM-RSs. That is, the orthogonalization processing section 121 applies CS and/or OCC to the DM-RSs. The orthogonalization processing section 121 outputs the DM-RSs, to which the orthogonalization process has been applied, to the multiplexing sections 122*a* and 122*b*.

The multiplexing section 122a multiplexes the modulated uplink codeword #1 transmission data and a DM-RS sequence, and outputs the multiplex signal to the discrete Fourier transform (DFT) sections 123a. The multiplexing section 122b multiplexes the modulated uplink codeword #2 transmission data and a DM-RS sequence, and outputs the multiplex signal to the discrete Fourier transform (DFT) sections 123b.

The discrete Fourier transform (DFT) sections 123a and 123b perform a discrete Fourier transform of the multiplex signals and convert the time sequence information into frequency domain information. The discrete Fourier transform (DFT) sections 123a and 123b output the signals after the DFT to the subcarrier mapping section 124a and 124b. The subcarrier mapping sections 124a and 124b perform frequency domain mapping based on scheduling information from the downlink PDCCH decoding section 114. Then, the subcarrier mapping sections 124a and 124b output the transmission data after the mapping to a codeword layer mapping section 125.

In the codeword layer mapping section 125, the uplink codeword #1 and #2 transmission data input from the subcarrier mapping sections 124a and 124b is divided into a number to match the number of layers, in accordance with uplink rank information from the downlink PDCCH decoding section 114. Then, the divided uplink code word #1 and #2 transmission data is input in a precoding weight multiplication section 126.

The precoding weight multiplication section 126 shifts the phase and/or amplitude of transmission signals, for each of the transmitting/receiving antennas 102a and 102b, based on uplink precoding information from the downlink PDCCH decoding section 114 (weighting of transmission antennas by means of precoding). By this means, it is possible to increase the received power of received signals in the radio base station apparatus 20, and improve throughput performance. After the precoding, following the multiplexing process in the multiplexing section 127, the transmission signals are subjected to an inverse fast Fourier transform in the inverse fast Fourier transform (IFFT) sections 128a and 128b and converted from frequency domain signals into time domain signals. Then, in cyclic prefix (CP) attaching sections 129a and 129b, cyclic prefixes are attached to the transmission signals. Here, the cyclic prefixes function as guard intervals for cancelling multipath propagation delay and differences in receiving timing between a plurality of users in the radio base station apparatus 20. The transmission signals with cyclic prefixes attached thereto are transmitted to the transmitting/receiving sections 106a and 106b.

With the radio communication method of the present invention, the allocation section 243 of the radio base station apparatus 20 allocates ZC sequences in a new number of randomized sequences between the number of randomized sequences corresponding to a ZC sequence having a length of the largest prime number, not exceeding the ZC sequence length required in the uplink DM-RS reference signal, and the number of randomized sequences defined in Rel. 10 LTE. In this case, the allocation section 243 allocates ZC sequences that are not allocated in LTE of Rel. 10 or earlier versions. That is, the allocation section 243 allocates ZC sequences in a new number of randomized sequences between the number of randomized sequences corresponding to a ZC sequence having a length of the largest prime number, not exceeding the ZC sequence length required in the uplink DM-RS reference signal, and the number of randomized sequences defined in Rel. 10 LTE. To be more specific, the allocation section 243 allocates ZC sequences in the above first method to the fourth method. At this time, part of the information of the allocated ZC sequences is signaled to the mobile terminal apparatus 10. For example, with the first method and the fourth method, the sequence number q is signaled. Also, the second method signals the number of randomized sequences, the number of levels, and so on. Furthermore, the third method signals the base sequence number.

In the DM-RS sequence generating section 120 of the mobile terminal apparatus 10, DM-RS sequences are generated using the ZC sequences allocated in the new number of randomized sequences. At this time, in the DM-RS sequence generating section 120, in the first method and the fourth method, when the sequence number q is reported, DM-RS sequences are generated according to above equation 2 and equation 3, using the sequence number q. Also, the DM-RS sequence generating section 120 derives the sequence number q by performing a remainder calculation between indices X signaled from the radio base station apparatus and the largest number of randomized sequences Y per RB (X % Y), or derive the sequence number q by performing a remainder calculation between parameters (Z) that are not signaled from the radio base station apparatus and the largest number of randomized sequences Y per RB (Z % Y), or derive the sequence number q by performing a remainder calculation with respect to indices W ($V_{cell}$ID, cell ID and so on) signaled from the radio base station apparatus (W %60). Also, with the second method, DM-RS sequences are generated using the number of randomized sequences, the number of levels and so on, signaled from the radio base station apparatus. Also, with the third method, DM-RS sequences are generated using the base sequence number signaled from the radio base station apparatus. The generated DM-RS sequences are subjected to the CS process and/or OCC process in the orthogonalization processing section 121. The DM-RSs processed in this way are orthogonalized in cells, and assume a state of being randomized between cells.

In this way, with the present invention, a new number of randomized sequences that is between the number of randomized sequences corresponding to a ZC sequence having a length of the largest prime number, not exceeding the ZC sequence length required in the uplink DM-RS reference signal, and the number of randomized sequences defined in Rel. 10 LTE, is used, so that it is possible to allocate more DM-RS sequences. As a result of this, it is possible to improve the flexibility of allocation of more DM-RS resources.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-108742, filed on May 10, 2012, including the specification, drawings and abstract, is incorporated herein by reference in its entirety.

The invention claimed is:

1. A radio communication system comprising a radio base station apparatus and a mobile terminal apparatus that is configured to be able to communicate with the radio base station apparatus, wherein:
the radio base station apparatus comprises an allocation section configured to allocate Zadoff-Chu sequences in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE,
the mobile terminal apparatus comprises a generating section configured to generate demodulation reference signal sequences using the Zadoff-Chu sequences allocated in the new number of randomized sequences, and
the number of randomized sequences defined in Rel. 10 LTE is set to 30 for bandwidth of 1 RB to 5 RBs, and is set to 60 for bandwidth of 6 RBs or more.

2. The radio communication system according to claim 1, wherein the new number of randomized sequences is set to a number selected from 30, 60 and at least one different number from 30 and 60.

3. The radio communication system according to claim 1, wherein the allocation section does not allocate the Zadoff-Chu sequences to a narrow transmission bandwidth.

4. The radio communication system according to claim 1, wherein the new number of randomized sequences is determined by combining a group number u and a base sequence number v that are used to generate the Zadoff-Chu sequences.

5. The radio communication system according to claim 4, wherein the radio base station apparatus reports the base sequence number v to the mobile terminal apparatus.

6. The radio communication system according to claim 4, wherein the radio base station apparatus reports a sequence number q that is used to generate the Zadoff-Chu sequences, to the mobile terminal apparatus.

7. The radio communication system according to claim 4, wherein the mobile terminal apparatus derives a sequence number q that is used to generate the Zadoff-Chu sequences, from an index signaled from the radio base station apparatus.

8. The radio communication system according to claim 1, wherein the radio base station apparatus reports a sequence number q that is used to generate the Zadoff-Chu sequences, to the mobile terminal apparatus.

9. The radio communication system according to claim 1, wherein the mobile terminal apparatus derives a sequence number q that is used to generate the Zadoff-Chu sequences, from an index signaled from the radio base station apparatus.

10. A radio base station apparatus in a radio communication system comprising the radio base station apparatus and a mobile terminal apparatus that is configured to be able to communicate with the radio base station apparatus, the radio base station apparatus comprising:
an allocation section configured to allocate Zadoff-Chu sequences in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE,
wherein the number of randomized sequences defined in Rel. 10 LTE is set to 30 for bandwidth of 1 RB to 5 RBs, and is set to 60 for bandwidth of 6 RBs or more.

11. A mobile terminal apparatus in a radio communication system comprising a radio base station apparatus and the mobile terminal apparatus configured to be able to communicate with the radio base station apparatus, the mobile terminal apparatus comprising:
a generating section configured to generate demodulation reference signal sequences using Zadoff-Chu sequences allocated in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE,
wherein the number of randomized sequences defined in Rel. 10 LTE is set to 30 for bandwidth of 1 RB to 5 RBs, and is set to 60 for bandwidth of 6 RBs or more.

12. A radio communication method in a radio communication system comprising a radio base station apparatus and a mobile terminal apparatus that is configured to be able to communicate with the radio base station apparatus, the radio communication method comprising the steps of:
in the radio base station apparatus, allocating Zadoff-Chu sequences in a new number of randomized sequences, the new number being a number between the number of randomized sequences corresponding to a Zadoff-Chu sequence having a length of a largest prime number, not exceeding a Zadoff-Chu sequence length required in an uplink demodulation reference signal, and the number of randomized sequences defined in Rel. 10 LTE; and
in the mobile terminal apparatus, generating demodulation reference signal sequences using the Zadoff-Chu sequences allocated in the new number of randomized sequences,
wherein the number of randomized sequences defined in Rel. 10 LTE is set to 30 for bandwidth of 1 RB to 5 RBs, and is set to 60 for bandwidth of 6 RBs or more.

* * * * *